(12) United States Patent
Yoshino

(10) Patent No.: US 12,308,452 B2  
(45) Date of Patent: May 20, 2025

(54) LAMINATED BODY FOR POWER STORAGE DEVICE OUTER PACKAGING MATERIAL

(71) Applicant: Resonac Packaging Corporation, Hikone (JP)

(72) Inventor: Kenji Yoshino, Isehara (JP)

(73) Assignee: Resonac Packaging Corporation, Hikone (JP)

( * ) Notice: Subject to any disclaimer, the term of this patent is extended or adjusted under 35 U.S.C. 154(b) by 600 days.

(21) Appl. No.: 17/333,018

(22) Filed: May 28, 2021

(65) Prior Publication Data

US 2021/0376417 A1    Dec. 2, 2021

(30) Foreign Application Priority Data

May 29, 2020 (JP) ................. 2020-094316  
Mar. 31, 2021 (JP) ................. 2021-060725

(51) Int. Cl.  
*B32B 15/085* (2006.01)  
*B32B 7/12* (2006.01)  
(Continued)

(52) U.S. Cl.  
CPC ......... *H01M 50/224* (2021.01); *B32B 15/088* (2013.01); *B32B 15/09* (2013.01); *H01M 50/193* (2021.01); *H01M 50/227* (2021.01)

(58) Field of Classification Search  
CPC ..... B32B 15/088; B32B 15/09; B32B 15/085; B32B 15/20; B32B 2255/06; B32B 2255/10; B32B 2255/26; B32B 27/08; B32B 27/32; B32B 27/34; B32B 27/36; B32B 2307/5825; B32B 2307/306; B32B 2307/31; B32B 2307/54; B32B 2307/581; B32B 2307/736; B32B 2307/558; (Continued)

(56) References Cited

U.S. PATENT DOCUMENTS

2016/0301040 A1* 10/2016 Takahagi ............ H01M 50/119  
2016/0365545 A1* 12/2016 Takahagi ............... B32B 27/36  
(Continued)

FOREIGN PATENT DOCUMENTS

JP    4559548 B2    11/2004  
JP    5453680 B2     5/2012  
(Continued)

*Primary Examiner* — Humera N. Sheikh  
*Assistant Examiner* — Kevin C T Li  
(74) *Attorney, Agent, or Firm* — MORI & WARD, LLP

(57) ABSTRACT

A laminated body includes a barrier layer made of metal, a base material layer made of a heat-resistant resin laminated on an outer side surface of the barrier layer, and a sealant layer made of a heat sealable resin laminated to an inner side surface of the barrier layer. The base material layer includes a polyester film layer as an outer layer and a polyamide film layer as an inner layer. The polyester film layer is 500 MPa to 600 MPa in a sum of breaking strength in an MD and breaking strength in a TD, 0.8 to 1.1 in a ratio of the breaking strength in the TD to the breaking strength in the MD, and 110% to 200% in breaking elongation in the MD and breaking elongation in the TD. The MD denotes a machine flow direction, and the TD denotes a direction perpendicular to the MD.

18 Claims, 2 Drawing Sheets

(51) Int. Cl.
- *B32B 15/088* (2006.01)
- *B32B 15/09* (2006.01)
- *B32B 15/20* (2006.01)
- *B32B 27/08* (2006.01)
- *B32B 27/32* (2006.01)
- *B32B 27/34* (2006.01)
- *B32B 27/36* (2006.01)
- *H01M 50/193* (2021.01)
- *H01M 50/224* (2021.01)
- *H01M 50/227* (2021.01)

(58) Field of Classification Search
CPC . B32B 2307/714; B32B 7/12; B32B 2457/10; H01M 50/224; H01M 50/193; H01M 50/227; H01M 10/52; H01M 10/0525; H01M 50/121; H01M 50/1243; H01M 50/1245; H01M 50/126; H01M 50/119; H01M 50/129; H01M 50/131; H01M 50/14; H01M 50/145; H01M 2300/0065; H01M 2200/20; H01G 11/80; H01G 11/78; Y02T 10/70

See application file for complete search history.

(56) References Cited

U.S. PATENT DOCUMENTS

| | | | |
|---|---|---|---|
| 2017/0141362 A1* | 5/2017 | Ijuin | H01G 11/78 |
| 2017/0263899 A1* | 9/2017 | Takahagi | B32B 15/08 |
| 2017/0365825 A1* | 12/2017 | Ijuin | H01M 50/55 |

FOREIGN PATENT DOCUMENTS

| | | | |
|---|---|---|---|
| JP | 5830585 B2 | | 10/2014 |
| WO | 2015083657 A1 | † | 6/2015 |
| WO | 2016031758 A1 | † | 3/2016 |
| WO | 2016140256 A1 | † | 9/2016 |

\* cited by examiner
† cited by third party

LAMINATED BODY FOR POWER STORAGE DEVICE OUTER PACKAGING MATERIAL

BACKGROUND OF THE INVENTION

Technical Field

The present invention relates to a laminated body for a power storage device outer packaging material.

Background of the Invention

Conventionally, as a battery packaging material for accommodating a battery, metallic ones of a cylindrical type or a square type have been widely used. In recent years, a battery has become used as one of diversified energy supply sources or energy storages, and its weight reduction and space-saving are also required.

As one of the measures, a metal-resin laminated sheet (hereinafter referred to as a "laminated sheet") in which a resin film is laminated on both sides of a metal foil has come to be used as a battery packaging material. By using the sheet as it is or subjecting the sheet to deep drawing in accordance with the accommodation storage space, it is possible to provide a battery with a maximum capacity in a limited space.

Since a battery using such a laminated sheet is excellent in corrosion resistance and sealing performance, the laminated sheet is being developed for use in a large battery packaging material for automobile driving used in, for example, an electric vehicle (EV) and a plug-in hybrid electric vehicles (PHEV). As a configuration example of a large battery packaging material capable of withstanding the use in harsh environments, a configuration in which a plurality of base material layers are layered on an outer side of a metal foil has been proposed (see Patent Documents 1 to 3 listed below).

Note that the term "outer side" refers to a side opposite of a storage space side in a battery packaging material. Also note that the term "inner side" refers to a storage space side in the battery packaging material.

Patent Document 1 proposes a battery packaging material having puncture strength, tensile strength, bending property, heat resistance, and chemical resistance by making the base material layer a two-layer configuration of a PET film/ONY film.

Also, in Patent Document 2, a battery packaging material having heat resistance, water resistance, and chemical resistance (prevention of whitening of an ONY (Oriented Nylon, i.e., stretched nylon) film by an electrolyte) has been proposed by making the base material layer a two-layer configuration of a PET film/ONY film.

Further, in Patent Document 3, a packaging material for an in-vehicle battery packaging material is proposed. The packaging material has vibration resistance and formability considering vibrations when driving an automobile by making the base material a two-layer configuration of a PET film/ONY film and further defining the ranges of the breaking strength and the breaking elongation of the PET film.

Patent Document

Patent Document 1: Japanese Patent No. 4,559,548
Patent Document 2: Japanese Patent No. 5,830,585
Patent Document 3: Japanese Patent No. 5,453,680

SUMMARY OF THE INVENTION

According to an aspect of the present disclosure,

[1] A laminated body for a power storage device outer packaging material, includes:
a barrier layer made of metal;
a base material layer made of a heat-resistant resin laminated on an outer side surface of the barrier layer; and
a sealant layer made of a heat sealable resin laminated to an inner side surface of the barrier layer,
wherein the base material layer is composed of a polyester film layer as an outer layer and a polyamide film layer as an inner layer, and
wherein the polyester film layer is
500 MPa to 600 MPa in a sum of breaking strength in an MD and breaking strength in a TD,
0.8 to 1.1 in a ratio of the breaking strength in the TD to the breaking strength in the MD, and
110% to 200% in breaking elongation in the MD and breaking elongation in the TD, and
wherein the MD denotes a machine flow direction, and the TD denotes a direction perpendicular to the MD.

[2] The laminated body for a power storage device outer packaging material as recited in the above-described Item [1],
wherein the polyamide film layer is 2.5% to 6% in a hot water shrinkage percentage in the MD and a hot water shrinkage percentage in the TD.

[3] The laminated body for a power storage device outer packaging material as recited in the above-described Item [1] or [2],
wherein the polyamide film layer is
550 MPa to 700 MPa in a sum of the breaking strength in the MD and the breaking strength in the TD, and
90% to 200% in the breaking elongation in the MD and the breaking elongation in the TD.

[4] The laminated body for a power storage device outer packaging material as recited in any one of the above-described Items [1] to [3],
wherein an in-between base materials adhesive layer is laminated between the polyester film layer and the polyamide film layer, and
wherein the in-between base materials adhesive layer is 70 MPa to 400 MPa in a Young's modulus, 20 MPa to 70 MPa in breaking strength, and 50% to 400% in breaking elongation.

[5] The laminated body for a power storage device outer packaging material as recited in the above-described Item [4],
wherein the in-between base materials adhesive layer is composed of a cured material of an adhesive agent, the adhesive agent including,
as a main agent, one or two or more types of resins selected from the group consisting of a polyurethane-based resin, a polyester polyurethane-based resin, a polyether polyurethane-based resin, a polyether-based resin, and a polyester-based resin, and
as a curing agent, a multifunctional isocyanate.

EMBODIMENTS FOR CARRYING OUT THE INVENTION

A laminated body for a power storage device outer packaging material of the present invention constitutes an outer packaging material for packaging a power storage device.

Figure 1:
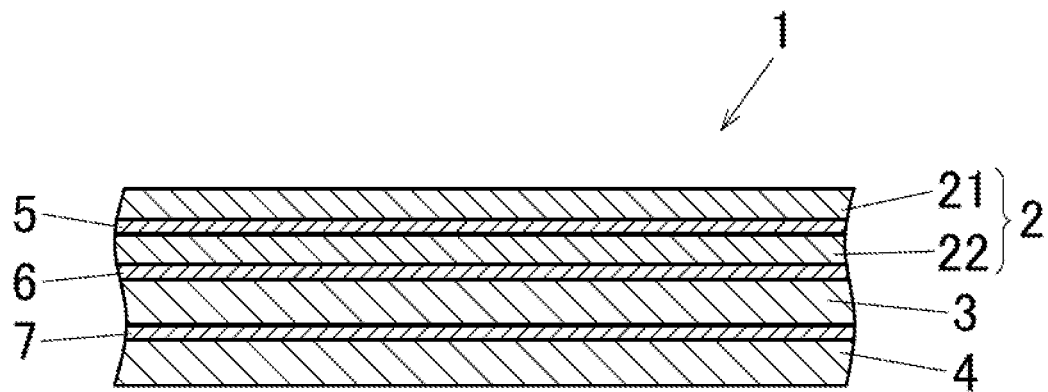
FIG. 1 is a cross-sectional view showing a laminated body for a power storage device outer packaging material according to an embodiment of the present invention.

As shown in FIG. 1, the laminated body 1 for a power storage device outer packaging material of this embodiment is configured such that a sealant layer 4 is laminated on the inner side surface of a barrier layer 3 via a first adhesive layer 7 and a base material layer 2 is laminated on the outer side surface of the barrier layer 3 via a second adhesive layer 6.

The base material layer 2 of the present invention is made of a heat-resistant resin and is laminated on the outer side surface of the barrier layer 3 to be described later. Note that the heat-resistant resin forming the base material layer 2 is a resin having a melting point higher than that of a heat sealable resin forming the sealant layer 4, which will be detailed later, by 10° C. or more, more preferably 20° C. or more.

The base material layer 2 of this embodiment has a two-layer structure and is composed of a polyester film layer 21 and a polyamide film layer 22.

The polyester film layer 21 of the present invention constitutes the outer layer of the base material layer 2.

The polyester film layer 21 of this embodiment has the following features in the breaking strength in the MD and in the TD and in the breaking elongation in the MD and in the TD. Note that the term "MD" refers to a "machine flow direction", and the term "TD" refers to a "direction perpendicular to the MD (machine flow direction)".

In the polyester film layer 21 of this embodiment, the sum of the breaking strength in the TD and the breaking strength in the MD is 500 MPa to 600 MPa, more preferably 520 MPa to 580 MPa among them.

When the sum of the breaking strength in the MD and the breaking strength in the TD is less than 500 MPa, breaking will occur at a location (near the shoulder R of a punch) subjected to severe molding processing. While, when it exceeds 600 MPa, the breaking strength of the polyester film layer becomes excessive, which prevents the molding into a predetermined shape.

The ratio of the breaking strength in the TD to the breaking strength in the MD is 0.8 to 1.1. In particular, the ratio is preferably 0.85 to 0.95.

When the ratio of the breaking strength in the TD to the breaking strength in the MD is less than 0.8, the breaking strength in the TD is weak, which causes breakage at a portion to be subjected to severe molding processing. While, when the ratio exceeds 1.1, the extension in the TD needs to be increased at the time of the film formation of the polyester film layer. Therefore, the film formation is difficult and it is disadvantageous in terms of cost.

Furthermore, in the polyester film layer 21 of this embodiment, the breaking elongation in the MD and the breaking elongation in the TD are both 110% to 200%.

When the breaking elongation in the MD and the breaking elongation in the TD are less than 110%, breakage may occur in the portion (near the shoulder R of the punch) to be subjected to severe molding processing. While, even when it exceeds 200%, there is no significant difference in the effects of molding processing.

Further, as the polyester film layer 21 of this embodiment, a polyethylene terephthalate (PET) film, a polybutylene terephthalate (PBT) film, a polyethylene naphthalate (PEN) film, or the like can be used. Among them, a stretched film thereof is preferably used.

Further, the thickness of the polyester film layer 21 of this embodiment is preferably 6 μm to 50 μm, more preferably 12 μm to 25 μm.

In order to improve the adhesiveness to an in-between base materials adhesive layer 5, which will be described later, in the polyester film layer 21 of this embodiment, it is preferable to laminate an easily adhesive layer on at least one side of the polyester film layer 21 or subject at least the one side of the polyester film layer 21 to a corona treatment. By laminating the easily adhesive layer, the adhesion and the adhesive strength can be improved. The method of laminating the easily adhesive layer is not particularly limited, but the lamination is preferably performed by an in-line coating. This is because the easily adhesive layer can be uniformly formed on the surface of the polyester film layer 21.

As the easily adhesive layer, for example, an acryl-based resin, a urethane-based resin, a polyester-based resin, an olefin-based resin, a fluorine-based resin, a vinyl-based resin, a chlorine-based resin, a styrene-based resin, various graft-based resin, an epoxy-based resin, a silicone-based resin, or the like, may be used, and a mixture of these resins may be used. Among them, an acryl-based resin or a polyester-based resin is preferably used from the viewpoint of adhesion.

The polyamide film layer 22 of the present invention constitutes an inner layer of the base material layer 2.

The polyamide film layer 22 of this embodiment is 2.5% to 6% in both the hot water shrinkage percentage in the MD and the hot water shrinkage percentage in the TD at 100° C. for 30 minutes. Among them, it is preferable to be 3% to 5%.

When the hot water shrinkage percentage in the MD and the hot water shrinkage percentage in the TD are less than 2.5%, breakage will occur at a location (near the shoulder R of a punch) to be subjected to severe molding processing. While, when it exceeds 6%, after the molding processing or the heat sealing, spring back (deformation) is likely to occur in a flange portion.

As described above, the polyamide film layer 22 is 2.5% to 6% in the hot water shrinkage percentage in the MD and the hot water shrinkage percentage in the TD. Therefore, the puncture strength of the polyamide film layer 22 is high, so that it becomes hard to be broken.

Further, in the base material layer 2 composed of the polyester film layer 21 high in the strength and the polyamide film layer 22 high in the strength and hard to be broken, the polyamide film layer 22 is 2.5% to 6% in the hot water shrinkage percentage in the MD and the hot water shrinkage percentage in the TD. Therefore, even in the case of a forming condition and/or a die shape requiring that the corner R is small and deep molding is performed for the purpose of increasing the energy density, it is possible to suppress the occurrence of forming cracking at the forming portion subjected to the most stringent molding processing near the shoulder R of a punch.

Further, in the polyamide film layer 22 of this embodiment, the sum of the breaking strength in the MD and the breaking strength in the TD is 550 MPa to 700 MPa. Among them, the sum is preferably 550 MPa to 650 MPa.

When the sum of the breaking strength in the MD and the breaking strength in the TD is less than 550 MPa, breakage will occur at a portion (near the shoulder R of a punch) to be subjected to severe molding processing. While, when it exceeds 700 MPa, the breaking strength of the polyamide film layer 22 becomes excessively high, which prevents the molding into a predetermined shape.

Further, both the breaking elongation in the MD and the breaking elongation in the TD are 90% to 200%.

When the breaking elongation in the MD and the breaking elongation in the TD are each less than 90%, breaking occurs at a portion (near the shoulder R of the punch) to be subjected to severe molding processing. While, even when it exceeds 200%, there is no significant difference in the effects of molding processing.

As described above, in the polyamide film layer 22, the sum of the breaking strength in the MD and the breaking strength in the TD is 550 MPa to 700 MPa, and the breaking elongation in the MD and the breaking elongation in the TD are each 90% to 200%. Therefore, the formability can be further enhanced because the polyamide film layer 22 is hard to be broken when molding.

As the polyamide film layer 22 of this embodiment, a nylon 6 film, a nylon 6, 6 film, and the like, can be used. Among them, a stretched film thereof is preferably used.

Further, the thickness of the polyamide film layer 22 of this embodiment is preferably 10 μm to 50 μm, and more preferably 15 μm to 25 μm.

It is preferable to subject the polyamide film layer 22 of this embodiment to a corona treatment or laminate an easily adhesive layer on the polyamide film layer 22 of this embodiment. In particular, providing an easily adhesive layer on the barrier layer 3 side provides excellent adhesion to the barrier layer 3 and enhances the adhesive strength. Although the forming method of the easily adhesive layer is not specifically limited, the easily adhesive layer can be formed by applying an aqueous emulsion (water-based emulsion) of one or two or more types of resins selected from the group consisting of an epoxy resin, a urethane resin, an acrylic ester resin, a methacrylic ester resin, and a polyethyleneimine resin to a surface of the polyamide film layer 22 and drying the aqueous emulsion. Although the coating method is not particularly limited, examples thereof include a spray coating method, a gravure roll coating method, a reverse roll coating method, a lip coating method, and the like. It is preferable that a corona treatment or the like be performed in advance on the surface of the polyamide film layer 22 prior to the lamination of the easily adhesive layer to increase the wettability.

Among them, the easily adhesive layer preferably has a configuration containing a urethane resin and an epoxy resin or a configuration containing a (meth) acrylic acid ester resin and an epoxy resin. In this case, it is possible to sufficiently suppress the occurrence of the delamination between the polyamide film layer 22 and the barrier layer 3.

In this embodiment, as shown in FIG. 1, an in-between base materials adhesive layer 5 is laminated between the polyester film layer 21 and the polyamide film layer 22.

The in-between base materials adhesive layer 5 of the present invention is a layer responsible for the adhesion between the polyester film layer 21 and the polyamide film layer 22.

In the in-between base materials adhesive layer 5 of this embodiment, the Young's modulus is 70 MPa to 400 MPa. Among them, it is preferably set to 100 MPa to 300 MPa.

When the Young's modulus is less than 70 MPa, the adhesive agent coating film breaks at the time of molding processing, and the broken point becomes an adhesive defect, resulting in molding break. On the other hand, when it exceeds 400 MPa, the adhesive agent coating film becomes excessively hard, thereby decreasing the adhesive strength. Therefore, the separation from the stretched film (the polyamide film layer 22) is likely to occur during the molding processing.

Further, the breaking strength of the in-between base materials adhesive layer 5 is 20 MPa to 70 MPa. Among them, it is preferably set to 30 MPa to 50 MPa.

When the breaking strength is less than 20 MPa, the adhesive agent coating film breaks during the molding processing, and this broken point becomes an adhesive defect, resulting in forming breakage. While, when it exceeds 70 MPa, the adhesive agent coating film becomes excessively hard, resulting in decreased adhesive strength. This easily causes separation from the stretched film (the polyamide film layer 22) during molding processing.

Further, the breaking elongation of the in-between base materials adhesive layer 5 is 50% to 400%. Among them, it is preferably set to 100% to 300%.

When the breaking elongation is less than 50%, the adhesive agent coating film breaks during molding processing, and this breaking point becomes an adhesive defect, resulting in molding break. While, when it exceeds 400%, there are no significant differences in the effects of molding processing.

The mechanical properties of the Young's modulus, the breaking strength, and the breaking elongation described above are the values obtained by measuring an adhesive agent bulk (cured material) test piece (a test piece of a two-part curing type adhesive agent is a test piece having a thickness of 0.5 mm prepared according to JIS K6878-1 (2011)) according to JIS K7161-2 (2014).

As described above, in this embodiment, the in-between base materials adhesive layer 5 is laminated between the polyester film layer 21 and the polyamide film layer 22, and the in-between base materials adhesive layer 5 is 70 MPa to 400 MPa in the Young's modulus, 20 MPa to 70 MPa in the breaking strength, and 50% to 400% in the breaking elongation. Therefore, at the time of molding processing, the in-between base materials adhesive layer 5 follows the deformation behavior of the polyamide film layer 22. Thus, it is less likely to occur peeling between the polyamide film layer 22 and the in-between base materials adhesive layer 5. As a result, the characteristics (in particular, elongation and tear resistance) of the polyamide film layer 22 can be transmitted (added) to the barrier layer 3.

Also, as the in-between base materials adhesive layer 5 of this embodiment, it is preferable to use a cured material of the following adhesive agent. The adhesive agent includes, as a main agent, one or two or more types of resins selected from the group consisting of a polyurethane-based resin, a polyester polyurethane-based resin, a polyether polyurethane-based resin, a polyether-based resin, and a polyester-based resin, and as a curing agent, a multifunctional isocyanate.

Alternatively, an epoxy-based adhesive agent, an acrylic-based adhesive agent, a polyester amide-based adhesive agent, or a polyamide-based adhesive agent may be used.

Further, it is preferable to set the thickness of the in-between base materials adhesive layer 5 to 1 μm to 5 μm.

Further, as the multifunctional isocyanate, an aromatic multifunctional isocyanate, an aliphatic multifunctional isocyanate having an aromatic ring, and an aliphatic multifunctional isocyanate can be exemplified.

Although the aromatic multifunctional isocyanate is not particularly limited, for example, a tolylene diisocyanate (TDI), a diphenylmethane diisocyanate (MDI), a triphenylmethane triisocyanate, or the like can be used.

As the aliphatic multifunctional isocyanate having an aromatic ring, although not particularly limited, for example, an m-xylylene diisocyanate (XDI), a tetramethylxylene diisocyanate (TMXDI), or the like can be used.

As the aliphatic multifunctional isocyanate, although not particularly limited, for example, an hexamethylene diisocyanate (HDI) can be used.

As described above, the in-between base materials adhesive layer 5 is made of a cured material of an adhesive agent including one or two or more types of resins selected from the group consisting of a polyurethane-based resin, a polyester polyurethane-based resin, a polyether polyurethane-based resin, a polyether-based resin, and a polyester-based resin as a main agent and a multifunctional isocyanate as a curing agent. Therefore, it is possible to further suppress the occurrence of delamination and the like.

The barrier layer 3 of the present invention plays the role of imparting a gas barrier property for preventing the invasion of oxygen and moisture to the laminated body for a power storage device outer packaging material.

As the barrier layer 3 of this embodiment, an aluminum foil, a copper foil, a stainless-steel foil, a nickel foil, a titanium foil, or the like can be used. In particular, an aluminum foil of 1000 series or 8000 series defined by JIS H4160 is preferably used. The thickness thereof is preferably set to 20 μm to 100 μm.

Further, it is preferable that at least the inner side surface of the barrier layer 3, that is, the surface on the sealant layer side to be described layer, is provided with a chemical conversion treatment layer subjected to a phosphoric acid chromate treatment or a zirconium-based chemical conversion treatment, or the like. By being subjected to such a chemical conversion treatment, the surface of the barrier layer 3 can be sufficiently prevented from being corroded by the content (battery electrolyte, etc.). For example, by performing the following processing, the barrier layer 3 is subjected to the chemical conversion treatment. That is, the chemical conversion coating film is formed by applying one of the following aqueous solutions to a degreased surface of a metal foil and then drying it.

1) an aqueous solution composed of a mixture of phosphoric acid, chromic acid, and a metal salt of a fluoride
2) an aqueous solution composed of a mixture of a phosphoric acid, a chromic acid, a fluoride metal salt, and a non-metal salt
3) an aqueous solution composed of a mixture of an acryl-based resin and/or a phenol-based resin, and a phosphoric acid, a chromic acid, and a fluoride metal salt
4) an aqueous solution composed of a mixture of an acryl-based resin and/or a phenol-based resin, and a phosphoric acid salt or a phosphoric acid compound, a chromic acid salt or a chromic acid compound, and a fluoride metal salt In this embodiment, a second adhesive layer 6 is laminated on the outer side surface of the barrier layer 3.

The second adhesive layer 6 of this embodiment is a layer responsible for bonding the barrier layer 3 and the polyamide film layer 22.

As the second adhesive layer 6 of this embodiment, a urethane-based adhesive agent, an epoxy-based adhesive agent, and an acrylic-based adhesive agent can be used. The thickness is preferably set to 1 μm to 5 μm.

In this embodiment, a sealant layer 4 is laminated on the inner side surface of the barrier layer 3 via a first adhesive layer 7.

The sealant layer 4 of the present invention is made of a heat sealable resin and constitutes the innermost layer of the laminated body for a power storage device outer packaging material.

As the sealant layer 4 of this embodiment, a polyolefin-based film (cast polypropylene, linear low density polyethylene, etc.) can be used. The thickness is preferably set to 20 μm to 100 μm.

The first adhesive layer 7 of this embodiment is a layer responsible for bonding the barrier layer 3 and the sealant layer 4.

As the first adhesive layer 7 of this embodiment, an olefin-based adhesive agent and an epoxy-based adhesive agent can be used. In particular, an acid-modified olefin-based adhesive agent is preferably used.

As described above, in this embodiment, the base material layer 2 is composed of the polyester film layer 21 as the outer layer and the polyamide film layer 22 as the inner layer. The polyester film layer 21 is 500 MPa to 600 MPa in the sum of the breaking strength in the MD and the breaking strength in the TD, 0.8 to 1.1 in the ratio of the breaking strength in the TD to the breaking strength in the MD, and 110% to 200% in the breaking elongation in the MD and the breaking elongation in the TD. Therefore, the polyester film layer 21 is less likely to cause breakage, so that sufficient formability can be obtained even in a case where the molding shape is sharp and the molding height is high (deeper drawing can be performed).

Further, as the outer layer of the base material layer 2, the polyester film layer 21 is used. Therefore, the chemical resistance and the impact resistance can be increased.

Figure 2:
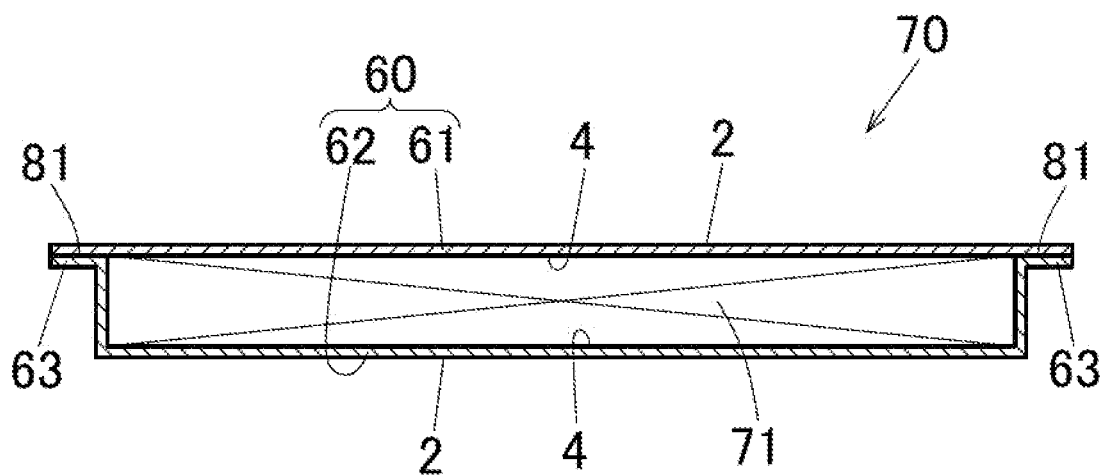
FIG. 2 is a cross-sectional view showing an embodiment of a storage device formed by using the laminated body for a power storage device outer packaging material according to the embodiment.
Figure 3:
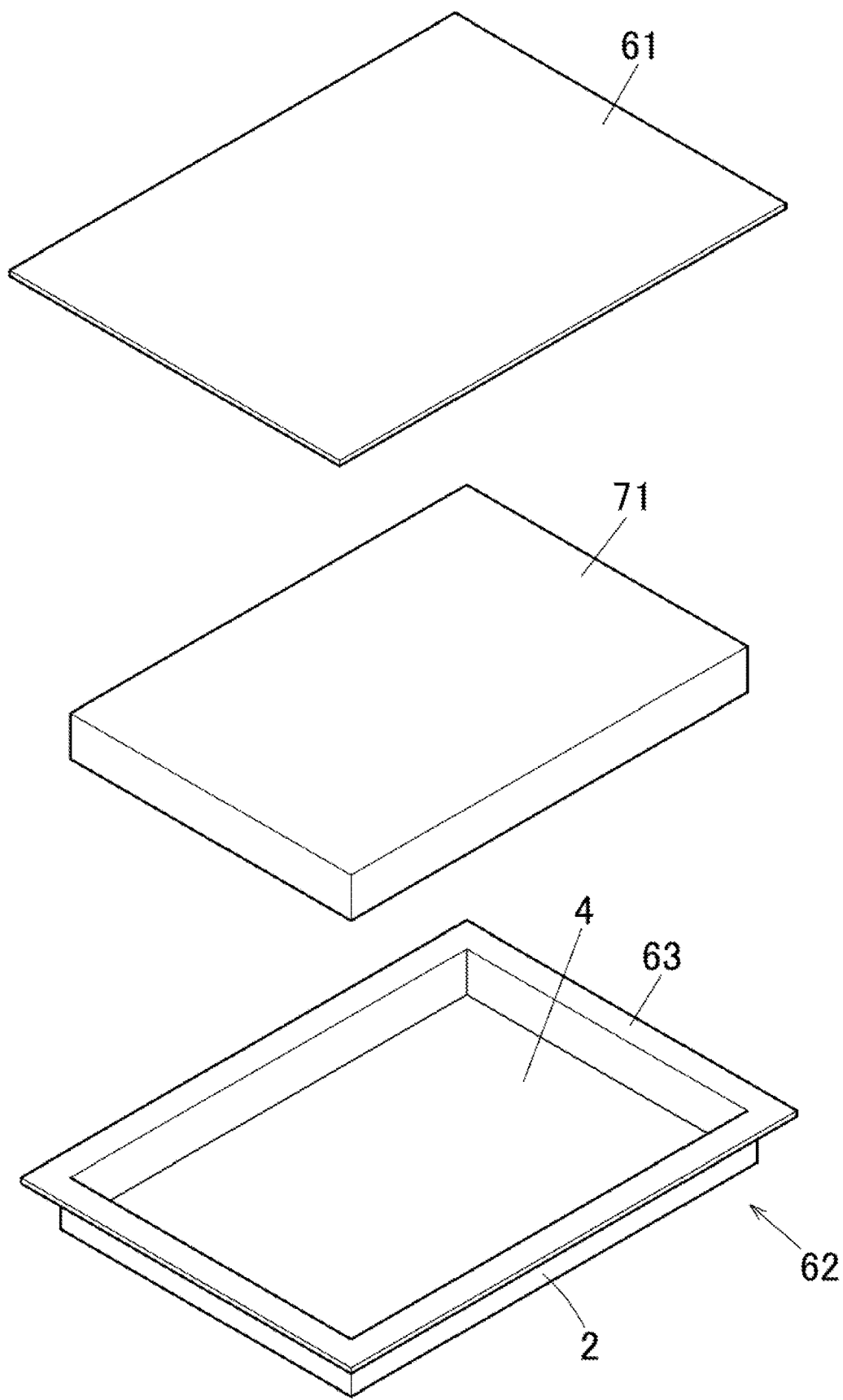
FIG. 3 is a perspective view showing an outer packaging material (planar one), a power storage device main body, and an outer packaging case (molded body formed into a three-dimensional shape), which constitute the power storage device of FIG. 2, in a separated state prior to performing heat-sealing.

FIG. 2 is a cross-sectional view showing an embodiment of the power storage device 70 formed using the laminated body 1 for a power storage device outer packaging material of this embodiment. FIG. 3 is a perspective view showing an outer packaging material 61 (planar one), a power storage device main body 71, and an outer packaging case 62 (formed body molded into a three-dimensional shape), which constitute the power storage device 70 of FIG. 2, in a separated state prior to performing heat-sealing.

The power storage device outer packaging material 61 configured by the laminate 1 for a power storage device outer packaging material according to this embodiment is used as, for example, an outer packaging material for a lithium-ion secondary battery. The outer packaging material 61 may be used as an outer packaging material as it is without being molded. Alternatively, the outer packaging material 61 may be used as an outer packaging case 62 by subjecting it to molding, such as, e.g., deep drawing and stretch forming.

In this embodiment, as shown in FIG. 2 and FIG. 3, the outer packaging member 60 is configured by a planar outer packaging material 61 and an outer packaging case 62. The outer packaging case 62 is obtained by molding the outer packaging material 61.

The accommodating recess of the outer packaging case 62 accommodates a substantially rectangular parallelepiped shaped power storage device main body 71 (electrochemical device or the like). The outer packaging material 61 is arranged without being molded above the power storage device main body 71 with the sealant layer 4 side arranged inward (arranged on the lower side). The peripheral portion of the sealant layer 4 of the outer packaging material 61, the sealant layer 4 of the flange portion 63 of the outer packaging case 62 are sealed and joined by thermal fusion at the heat sealing portion 81. Thus, the power storage device 70 is configured.

The inner surface of the accommodation recess in the outer packaging case 62 is configured by the sealant layer 4, and the outer surface of the accommodation recess is configured by the base material layer 2.

The power storage device main body 71 is not particularly limited, but may be exemplified by, e.g., a battery main body, a capacitor main body, and a condenser main body.

The outer packaging member 60 in the above-described embodiment has a configuration consisting of the planar outer packaging material 61 and the outer packaging case 62 obtained by molding the outer packaging material 61, but not particularly limited to such a combination. For example, the outer packaging member 60 may be a configuration consisting of a pair of planar outer packaging materials 61. Alternatively, the outer packaging member 60 may be a configuration consisting of a pair of the outer packaging cases 62.

EXAMPLES

Next, some specific examples of the present invention will be described, but the present invention is not particularly limited to these examples.

Example 1

Both surfaces of an aluminum foil (barrier layer 3) having a thickness of 40 μm were subjected to a chemical conversion treatment. The chemical conversion treatment was performed by applying a chemical processing liquid composed of a polyacrylic acid, a chromium (III) compound, water, and alcohol to both the surfaces and drying the chemical processing liquid at 180° C., and the chemical conversion treatment was performed so that the chromium adhesion amount became 10 mg/m$^2$. Note that as the aluminum foil, an A8021-0 material (annealed aluminum material) (JIS H4160 (2006)) was used.

Further, on one surface of the aluminum foil, a two-part curing type urethane-based adhesive agent (second adhesive layer 6) was applied to have a thickness of 4 μm by dry lamination. A stretched nylon film (polyamide film layer 22) having a thickness of 15 μm was bonded on the second adhesive layer 6.

Further, on the surface of the stretched nylon film, a polyester urethane-based adhesive agent (in-between base materials adhesive layer 5) was coated to have a thickness of 4 μm by dry lamination. A stretched polyethylene terephthalate (PET) film (polyester film layer 21) having a thickness of 12 μm was bonded to the in-between base materials adhesive layer 5.

Further, a heat aging treatment was performed at 60° C. for 7 days.

Then, on the other side of the aluminum foil, an olefin-based adhesive agent (first adhesive layer 7) was coated to have a thickness of 3 μm. A non-stretched polypropylene (CPP) film (sealant layer 4) having a thickness of 80 μm was bonded to the first adhesive layer 7.

Further, a heat aging treatment was performed at 40° C. for 10 days to produce a laminated body 1 for a power storage device outer packaging material of Example 1.

As the stretched polyethylene terephthalate (PET) film, the following stretched polyethylene terephthalate (PET) film was used. The breaking strength in the MD was 305 MPa, and the breaking strength in the TD was 272 MPa, i.e., their sum was 577 MPa. The ratio of the breaking strength in the TD to the breaking strength in the MD was 0.89. The breaking elongation in the MD was 138%. The breaking elongation in the TD was 160%.

As the stretched nylon film, the following stretched nylon film was used. The breaking strength in the MD was 276 MPa. The breaking strength in the TD was 310 MPa. That is, their sum was 586 MPa. The breaking elongation in the MD was 120%. The breaking elongation in the TD was 120%. The hot water shrinkage percentage in the MD was 3.5%. The hot water shrinkage percentage in the TD was 3.8%.

As a polyester urethane-based adhesive agent, the following polyester urethane-based adhesive agent was used. The Young's modulus was 150 MPa. The breaking strength was 40 MPa. The breaking elongation was 200%.

Example 2

As the stretched polyethylene terephthalate (PET) film, the following stretched polyethylene terephthalate (PET) film was used. The breaking strength in the MD was 280 MPa, and the breaking strength in the TD was 276 MPa, i.e., the sum was 556 MPa. The ratio of the breaking strength in the TD to the breaking strength in the MD was 0.99. The breaking elongation in the MD was 171%. The breaking elongation in the TD was 158%.

As the stretched nylon film, the following stretched nylon film was used. The breaking strength in the MD was 280 MPa. The breaking strength in the TD was 322 MPa. That is, their sum was 602 MPa. The breaking elongation in the MD was 140%. The breaking elongation in the TD was 120%. The hot water shrinkage percentage in the MD was 3.6%. The hot water shrinkage percentage in the TD was 4.2%.

A laminated body 1 for a power storage device outer packaging material was produced in the same manner as in Example 1 except for the above-described configuration.

Example 3

As a stretched polyethylene terephthalate (PET) film, the following stretched polyethylene terephthalate (PET) film was used. The breaking strength was 271 MPa in the MD. The breaking strength was 254 MPa in the TD. That is, their sum was 525 MPa. The ratio of the breaking strength in the TD to the breaking strength in the MD was 0.94. The breaking elongation in the MD was 155%. The breaking elongation in the TD was 151%.

As the stretched nylon film, the following stretched nylon film was used. The breaking strength in the MD was 276 MPa. The breaking strength in the TD was 320 MPa. That is, their sum was 596 MPa. The breaking elongation in the MD was 120%. The breaking elongation in the TD was 110%. The hot water shrinkage percentage in the MD was 3.4%. The hot water shrinkage percentage in the TD was 4.2%.

The laminated body 1 for a power storage device outer packaging material was produced in the same manner as in Example 1 except for the above-described confirmation.

Example 4

As the stretched polyethylene terephthalate (PET) film, the following stretched polyethylene terephthalate film was used. The breaking strength in the MD was 281 MPa. The breaking strength in the TD was 244 MPa. That is, their sum was 525 MPa. The ratio of the breaking strength in the TD to the breaking strength in the MD was 0.87. The breaking elongation in the MD was 112%. The breaking elongation in the TD was 139%.

As the stretched nylon film, the following stretched nylon film was used. The breaking strength in the MD was 285 MPa. The breaking strength in the TD was 325 MPa. That is, their sum was 610 MPa. The breaking elongation in the MD was 170%. The breaking elongation in the TD was 100%. The hot water shrinkage percentage in the MD was 3.5%. The hot water shrinkage percentage in the TD was 4.0%.

The laminated body 1 for a power storage device outer packaging material was produced in the same manner as in Example 0.1 except for the above-described configuration.

Example 5

As the stretched polyethylene terephthalate (PET) film, the stretched polyethylene terephthalate (PET) film was used. The breaking strength in the MD was 306 MPa. The breaking strength in the TD was 279 MPa. That is, their sum was 585 MPa. The ratio of the breaking strength in the TD to the breaking strength in the MD was 0.91. The breaking elongation in the MD was 110%. The breaking elongation in the TD was 117%.

As a stretched nylon film, the following stretched nylon film was used. The breaking strength in the MD was 276 MPa. The breaking strength in the TD was 320 MPa. That is, their sum was 596 MPa. The breaking elongation in the MD was 120%. The breaking elongation in the TD was 110%. The hot water shrinkage percentage in the MD was 3.4%. The hot water shrinkage percentage in the TD was 4.2%.

The laminated body 1 for a power storage device outer packaging material was produced in the same manner as in Example 1 except for the above-described configuration.

Example 6

As the stretched polyethylene terephthalate (PET) film, the following stretched polyethylene terephthalate (PET) film was used. The breaking strength in the MD was 240 MPa. The breaking strength in the TD was 260 MPa. That is, their sum was 500 MPa. The ratio of the breaking strength in the TD to the breaking strength in the MD was 1.08. The breaking elongation in the MD was 140%. The breaking elongation in the TD was 120%.

As the stretched nylon film, the following stretched nylon film was used. The breaking strength in the MD was 250 MPa. The breaking strength in the TD was 280 MPa. That is, their sum was 530 MPa. The breaking elongation in the MD was 120%. The breaking elongation in the TD was 100%. The hot water shrinkage percentage in the MD was 2.1%. The hot water shrinkage percentage in the TD was 2.0%.

The laminated body 1 for a power storage device outer packaging material was produced in the same manner as in Example 1 except for the above-described configuration.

Comparative Example 1

As the stretched polyethylene terephthalate (PET) film, the following stretched polyethylene terephthalate (PET) film was used. The breaking strength in the MD was 230 MPa. The breaking strength in the TD was 240 MPa. That is, their sum was 470 MPa. The ratio of the breaking strength in the TD to the breaking strength in the MD was 1.04. The breaking elongation in the MD was 100%. The breaking elongation in the TD was 90%.

As the stretched nylon film, the following stretched nylon film was used. The breaking strength in the MD was 210 MPa. The breaking strength in the TD was 270 MPa. That is, the sum was 480 MPa. The breaking elongation in the MD was 100%. The breaking elongation in the TD was 80%. The hot water shrinkage percentage in the MD was 2.3%. The hot water shrinkage percentage in the TD was 2.2%.

The laminated body 1 for a power storage device outer packaging material was produced in the same manner as in Example 1 except for the above-described configuration.

Comparative Example 2

As the stretched polyethylene terephthalate (PET) film, the following stretched polyethylene terephthalate (PET) film was used. The breaking strength in the MD was 310 MPa. The breaking strength in the TD was 295 MPa. Their sum was 605 MPa. The ratio of the breaking strength in the TD to the breaking strength in the MD was 0.95. The breaking elongation in the MD was 96%. The breaking elongation in the TD was 85%.

As the stretched nylon film, the following stretched nylon film was used. The breaking strength in the MD was 210 MPa. The breaking strength in the TD was 270 MPa. Their sum was 480 MPa. The breaking elongation in the MD was 100%. The breaking elongation in the TD was 80%. The hot water shrinkage percentage in the MD was 2.3%. The hot water shrinkage percentage of the TD was 2.2%.

The laminated body 1 for a power storage device outer packaging material was produced in the same manner as in Example 1 except for the above-described configuration.

The laminated body 1 for a power storage device outer packaging material prepared as described above was evaluated based on the following evaluation method. Note that the breaking strength and the breaking elongation were measured according to JIS K7161-2 (2014).

<Formability Evaluation>

Using a 25-ton press machine manufactured by Amada Corporation, a four-layer configuration packaging material for a battery was subjected to deep drawing. In this deep drawing, the battery packaging material was formed in a rectangular parallelepiped shape, i.e., a length 55 mm×a width 35 mm×each depth (corner portion was formed in a rounded shape). The test was performed in a range from a depth of 5 mm to a depth of 7 mm. The forming depth was increased by 0.5 mm. In the molded articles (five samples) acquired at each depth, the presence or absence of a pinhole or a crack was confirmed at four corners of each of the molded articles. Further, the number of samples with no pinholes or cracks at each depth was checked, and the molding limit height was confirmed.

The formability was evaluated based on the following criteria. Note that the presence or absence of pinholes or cracks were examined by a light transmission method in a dark room.

(Criteria)

"⊚" (Passed (Suitable)): At a forming depth of 7 mm, no pinholes or cracks were generated.

"○" (Passed (Acceptable): At a forming depth of 6 mm, no pinholes or cracks were generated.

"X" (Failed): At a forming depth of 6 mm, pinholes or cracks were generated.

The above results are shown in Table 1

TABLE 1

| Packaging material configuration | Item | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|---|
| Polyester film layer (PET 12 μm) | Tensile breaking strength (MPa) | MD | 305 | 280 | 271 | 281 | 306 | 240 | 230 | 310 |
| | | TD | 272 | 276 | 254 | 244 | 279 | 260 | 240 | 295 |
| | | MD + TD | 577 | 556 | 525 | 525 | 585 | 500 | 470 | 605 |
| | | TD/MD | 0.89 | 0.99 | 0.94 | 0.87 | 0.91 | 1.08 | 1.04 | 0.95 |
| | Tensile breaking elongation (%) | MD | 138 | 171 | 155 | 112 | 110 | 140 | 100 | 96 |
| | | TD | 160 | 158 | 151 | 139 | 117 | 120 | 90 | 85 |
| Polyamide film layer (ONY 15 μm) | Hot water shrinkage percentage (%) | MD | 3.5 | 3.6 | 3.4 | 3.5 | 3.4 | 2.1 | 2.3 | 2.3 |
| | | TD | 3.8 | 4.2 | 4.2 | 4.0 | 4.2 | 2.0 | 2.2 | 2.2 |
| | Tensile breaking strength (MPa) | MD | 276 | 280 | 276 | 285 | 276 | 250 | 210 | 210 |
| | | TD | 310 | 322 | 320 | 325 | 320 | 280 | 270 | 270 |
| | | MD + TD | 586 | 602 | 596 | 610 | 596 | 530 | 480 | 480 |
| | Tensile breaking elongation (%) | MD | 120 | 140 | 120 | 170 | 120 | 120 | 100 | 100 |
| | | TD | 120 | 120 | 110 | 100 | 110 | 100 | 80 | 80 |
| In-between substrates adhesive layer (4 μm) | Young's modulus (MPa) | — | 150 | 150 | 150 | 150 | 150 | 150 | 150 | 150 |
| | Breaking strength (MPa) | — | 40 | 40 | 40 | 40 | 40 | 40 | 40 | 40 |
| | Breaking elongation (%) | — | 200 | 200 | 200 | 200 | 200 | 200 | 200 | 200 |
| Barrier layer (40 μm) | | — | Al foil (A8021-O material) | Al foil (A8021-O material) | Al foil (A8021-O material) | Al foil (A8021-O material) | Al foil (A8021-O material) | Al foil (A8021-O material) | Al foil (A8021-O material) | Al foil (A8021-O material) |
| First adhesive layer (3 μm) | | — | Olefin-based adhesive agent | Olefin-based adhesive agent | Olefin-based adhesive agent | Olefin-based adhesive agent | Olefin-based adhesive agent | Olefin-based adhesive agent | Olefin-based adhesive agent | Olefin-based adhesive agent |
| Second adhesive layer (4 μm) | | — | Two-part curing type urethane-based adhesive agent | Two-part curing type urethane-based adhesive agent | Two-part curing type urethane-based adhesive agent | Two-part curing type urethane-based adhesive agent | Two-part curing type urethane-based adhesive agent | Two-part curing type urethane-based adhesive agent | Two-part curing type urethane-based adhesive agent | Two-part curing type urethane-based adhesive agent |
| Sealant layer (80 μm) | | — | CPP | CPP | CPP | CPP | CPP | CPP | CPP | CPP |
| Molding test result (the number of samples with no pinholes or cracks in each molding depth) | | 7 mm | 5 | 5 | 5 | 5 | 5 | 3 | 0 | 0 |
| | | 6.5 mm | 5 | 5 | 5 | 5 | 5 | 4 | 2 | 1 |
| | | 6 mm | 5 | 5 | 5 | 5 | 5 | 5 | 3 | 3 |
| | Evaluation | | ◎ | ◎ | ◎ | ◎ | ◎ | ○ | X | X |

Note that "PET" in Table 1 denotes a stretched polyethylene terephthalate, and "ONY" denotes a stretched nylon, and "CPP" denotes a cast polypropylene.

Also, "Al foil" in Table 1 denotes an aluminum foil. As the Al foil, an 8000 series alloy foil (A8021H-0, A8079H-0: JIS H4160) having good formability can be used.

As can be seen from Table 1, sufficient formability was obtained in Examples 1 to 6.

On the other hand, it can be seen that not enough formability was obtained in Comparative Examples 1 and 2.

INDUSTRIAL APPLICABILITY

The laminated body for a power storage device outer packaging material of the present invention can be used for batteries (such as lithium-ion rechargeable batteries and all solid state batteries) or lithium-ion batteries for use in mobile electronic devices, such as, e.g., smartphones and tablet computers, or batteries for storage for use in hybrid vehicles and electric vehicles, generators and nighttime electric power storage, or capacitors, e.g., such as electric double layer capacitors.

According to the above embodiment, the base material layer is composed of a polyester film layer as an outer layer and a polyamide film layer as an inner layer. The polyester film layer is 500 MPa to 600 MPa in a sum of the breaking strength in an MD and the breaking strength in a TD, 0.8 to 1.1 in the ratio of the breaking strength in the TD to the breaking strength in the MD, and 110% to 200% in the breaking elongation in the MD and the breaking elongation. Therefore, the polyester film layer becomes unlikely to be broken. Thus, even in a case where the molding shape is sharp and the forming height is high, adequate formability can be obtained (deeper drawing can be performed).

Further, the polyester film layer is used as the outer layer of the base material layer. Therefore, the chemical resistance and the impact resistance can be increased.

According to the above embodiment, the hot water shrinkage percentage in the MD and the hot water shrinkage percentage in the TD are 2.5% to 6%. Therefore, the puncture strength of the polyamide film layer is increased. Thus, it becomes unlikely to be broken.

In the base material layer composed of the polyester film layer having high strength and the polyamide film layer high in strength and hard to break, the hot water shrinkage percentage in the MD and the hot water shrinkage percentage in the TD of the polyamide film layer is 2.5% to 6%. Even in a forming condition or a molding die shape in which the corner R is required to be small and deep for enlarging the energy density, it is possible to suppress the occurrence of molding cracking at the molding processing portion subjected to the most severe molding processing near the shoulder R of a punch.

According to the above embodiment, the sum between the breaking strength in the MD and the breaking strength in the TD of the polyamide film layer is 550 MPa to 700 MPa, and the breaking elongation in the MD and the breaking elongation in the TD is 90% to 200%. Therefore, the polyamide film layer becomes unlikely to be broken at the time of molding. As a result, it is possible to further increase the formability.

According to the above embodiment, the in-between base materials adhesive layer is laminated between the polyester film layer and the polyamide film layer. The in-between base materials adhesive layer is 70 MPa to 400 MPa in the Young's modulus, 20 MPa to 70 MPa in the breaking strength, 50% to 400% in the breaking elongation. Therefore, the in-between base materials adhesive layer follows deformation behavior of the polyamide film layer during the molding processing. Thus, it is less likely to occur the separation between the polyamide film layer and the in-between base materials adhesive layer, which can transmit (add) the characteristics (in particular, elongation and tear resistance) of the polyamide film layer to the barrier layer.

According to the above embodiment, the in-between base materials adhesive layer is composed of a cured material of an adhesive agent. The adhesive agent includes:

as a main agent, one or two or more types of resins selected from the group consisting of a polyurethane-based resin, a polyester polyurethane-based resin, a polyether polyurethane-based resin, a polyether-based resin, and a polyester-based resin, and as a curing agent, a multifunctional isocyanate.

Therefore, it is possible to further suppress the occurrence of delamination or the like.

This application claims priority to Japanese Patent Application No. 2020-094316 filed on May 29, 2020 and Japanese Patent Application No. 2021-060725 filed on Mar. 31, 2021, the disclosure of which is incorporated herein by reference in its entirety.

The terms and expressions used herein are for illustration purposes only and are not used for limited interpretation, do not exclude any equivalents of the features shown and stated herein, and it should be recognized that the present invention allows various modifications within the scope of the present invention as claimed.

The invention claimed is:

1. A laminated body for a power storage device outer packaging material, comprising:

a barrier layer made of metal;

a base material layer made of a heat-resistant resin laminated on an outer side surface of the barrier layer, the base material layer is composed of a polyester film layer as an outer layer and a polyamide film layer as an inner layer; and a sealant layer made of a heat sealable resin laminated to an inner side surface of the barrier layer, wherein an in-between base materials adhesive layer is laminated between the polyester film layer and the polyamide film layer, and an easily adhesive layer is laminated on a surface of the polyester film layer, the surface of the polyester film layer being on a side of the in-between base materials adhesive layer, wherein the polyester film layer is 500 MPa to 600 MPa in a sum of breaking strength in an MD and breaking strength in a TD, 0.8 to 1.1 in a ratio of the breaking strength in the TD to the breaking strength in the MD, and 110% to 200% in breaking elongation in the MD and breaking elongation in the TD, and wherein the MD denotes a machine flow direction, and the TD denotes a direction perpendicular to the MD.

2. The laminated body for a power storage device outer packaging material as recited in claim 1, wherein the polyamide film layer is 2.5% to 6% in a hot water shrinkage percentage in the MD and a hot water shrinkage percentage in the TD.

3. The laminated body for a power storage device outer packaging material as recited in claim 1, wherein the polyamide film layer is 550 MPa to 700 MPa in a sum of the breaking strength in the MD and the breaking strength in the TD, and 90% to 200% in the breaking elongation in the MD and the breaking elongation in the TD.

4. The laminated body for a power storage device outer packaging material as recited in claim 1, wherein the in-between base materials adhesive layer is 70 MPa to 400 MPa in a Young's modulus, 20 MPa to 70 MPa in breaking strength, and 50% to 400% in breaking elongation.

5. The laminated body for a power storage device outer packaging material as recited in claim 4, wherein the in-between base materials adhesive layer is composed of a cured material of an adhesive agent, the adhesive agent including, as a main agent, one or two or more types of resins selected from the group consisting of a polyurethane-based resin, a polyester polyurethane-based resin, a polyether polyurethane-based resin, a polyether-based resin, and a polyester-based resin, and as a curing agent, a multifunctional isocyanate.

6. The laminated body for a power storage device outer packaging material as recited in claim 2, wherein the polyamide film layer is 550 MPa to 700 MPa in a sum of the breaking strength in the MD and the breaking strength in the TD, and 90% to 200% in the breaking elongation in the MD and the breaking elongation in the TD.

7. The laminated body for a power storage device outer packaging material as recited in claim 2,
wherein the in-between base materials adhesive layer is 70 MPa to 400 MPa in a Young's modulus, 20 MPa to 70 MPa in breaking strength, and 50% to 400% in breaking elongation.

8. The laminated body for a power storage device outer packaging material as recited in claim 3,
wherein the in-between base materials adhesive layer is 70 MPa to 400 MPa in a Young's modulus, 20 MPa to 70 MPa in breaking strength, and 50% to 400% in breaking elongation.

9. The laminated body for a power storage device outer packaging material as recited in claim 6,
wherein the in-between base materials adhesive layer is 70 MPa to 400 MPa in a Young's modulus, 20 MPa to 70 MPa in breaking strength, and 50% to 400% in breaking elongation.

10. The laminated body for a power storage device outer packaging material as recited in claim 7,
wherein the in-between base materials adhesive layer is composed of a cured material of an adhesive agent, the adhesive agent including,
as a main agent, one or two or more types of resins selected from the group consisting of a polyurethane-based resin, a polyester polyurethane-based resin, a polyether polyurethane-based resin, a polyether-based resin, and a polyester-based resin, and
as a curing agent, a multifunctional isocyanate.

11. The laminated body for a power storage device outer packaging material as recited in claim 8,
wherein the in-between base materials adhesive layer is composed of a cured material of an adhesive agent, the adhesive agent including,
as a main agent, one or two or more types of resins selected from the group consisting of a polyurethane-based resin, a polyester polyurethane-based resin, a polyether polyurethane-based resin, a polyether-based resin, and a polyester-based resin, and
as a curing agent, a multifunctional isocyanate.

12. The laminated body for a power storage device outer packaging material as recited in claim 9,
wherein the in-between base materials adhesive layer is composed of a cured material of an adhesive agent, the adhesive agent including,
as a main agent, one or two or more types of resins selected from the group consisting of a polyurethane-based resin, a polyester polyurethane-based resin, a polyether polyurethane-based resin, a polyether-based resin, and a polyester-based resin, and
as a curing agent, a multifunctional isocyanate.

13. The laminated body for a power storage device outer packaging material as recited in claim 1,
wherein the polyester film layer constitutes an outermost layer of the laminated body for a power storage device outer packaging material.

14. The laminated body for a power storage device outer packaging material as recited in claim 1,
wherein the in-between base materials adhesive layer is laminated between the polyamide film layer and the polyester film layer that constitutes an outermost layer of the laminated body for a power storage device outer packaging material.

15. The laminated body for a power storage device outer packaging material as recited in claim 1,
wherein the sealant layer is laminated on the inner side surface of the barrier layer via a first adhesive layer.

16. The laminated body for a power storage device outer packaging material as recited in claim 15,
wherein the base material layer is laminated on the outer side surface of the barrier layer via a second adhesive layer.

17. The laminated body for a power storage device outer packaging material as recited in claim 16,
wherein the second adhesive layer is a urethane-based adhesive agent, an epoxy-based adhesive agent, or an acrylic-based adhesive agent.

18. The laminated body for a power storage device outer packaging material as recited in claim 17,
wherein the second adhesive layer has a thickness of 1 μm to 5 μm.

* * * * *